March 15, 1932.  H. H. RAYMOND  1,849,805
CLAMP
Filed May 29, 1929
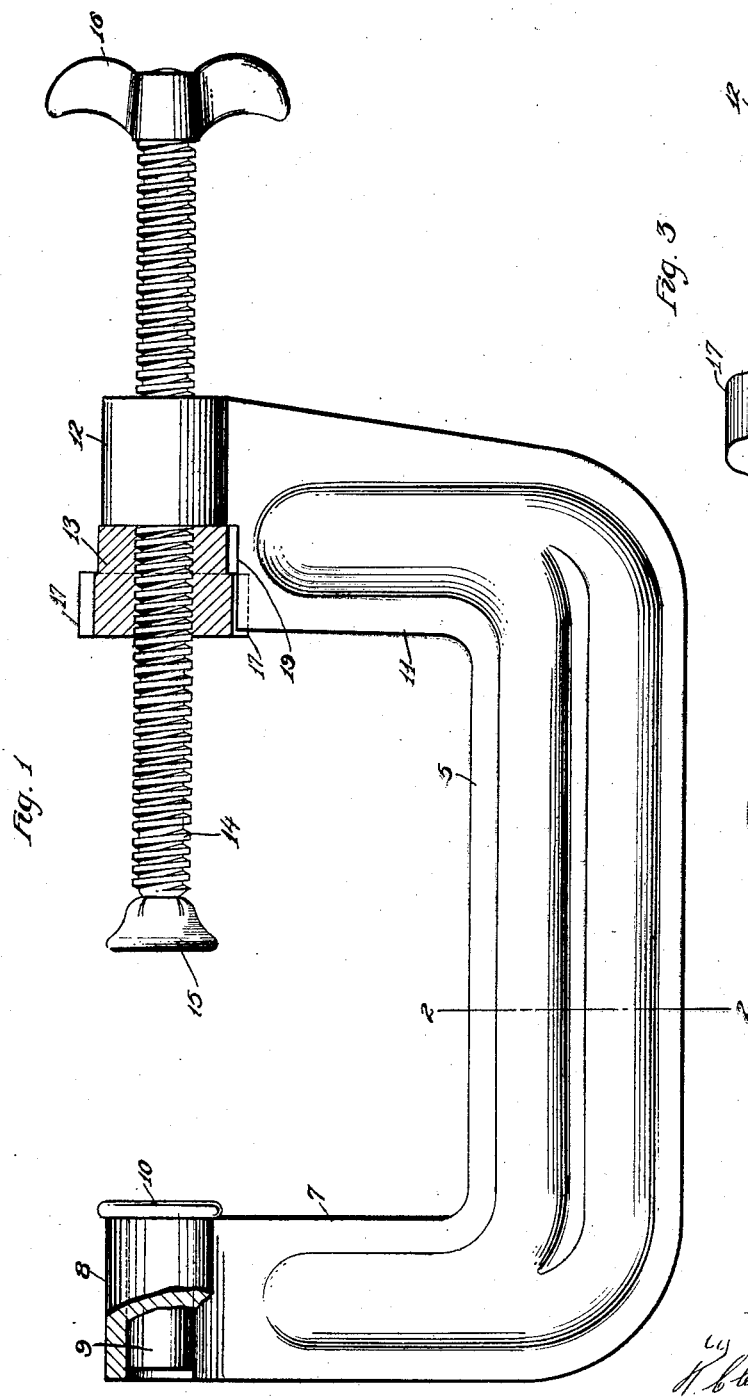
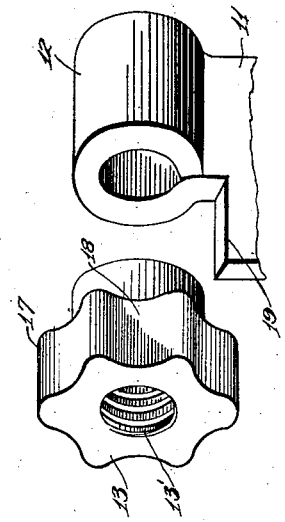
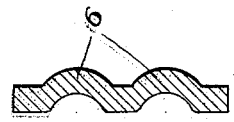
Inventor
Horace H. Raymond
his Attorney Patented Mar. 15, 1932

1,849,805

UNITED STATES PATENT OFFICE

HORACE H. RAYMOND, OF BERLIN, CONNECTICUT, ASSIGNOR TO THE STANLEY WORKS, OF NEW BRITAIN, CONNECTICUT, A CORPORATION OF CONNECTICUT

CLAMP

Application filed May 29, 1929. Serial No. 366,902.

This invention relates to improvements in clamps and has as its object to provide an improved clamp in which provision is made for the convenient and quick adjustment of the clamp through wide ranges of movement.

It is an aim of the invention to provide, in a clamp structure, an improved arrangement whereby the screw or threaded rod may be moved axially unaccompanied by any rotational movement so as to roughly adjust the screw in accordance with the size of the piece to be gripped and the screw, after it has been roughly adjusted, may be conveniently turned to engage the piece.

In accordance with the present invention, the arrangement is such that the nut member, which co-operates with the screw, may be readily disengaged from and engaged with the clamp member upon longitudinal adjustment of the screw and when the nut is disengaged, it may be very easily spun or rotated rapidly to move it to the new position desired.

A further object of the invention is to provide an improved clamp in which the above objects are obtained in a simple and effective structure.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one of the many embodiments which the present invention may take, Figure 1 is a side elevation of my improved clamp, with parts broken away, and parts shown in section.

Fig. 2 is a transverse sectional view on the line 2—2 in Figure 1, and

Fig. 3 is a fragmentary perspective view showing a portion of the clamp body and the improved nut member disengaged therefrom.

Referring more particularly to the drawings, 5 designates generally the body portion or frame which is preferably C-shaped. For purposes of economy, this body portion is preferably made of sheet metal, appropriately reinforced by pressed out beads 6. One end of one leg 7 of the clamp is rolled into a knuckle or eye 8 to receive the shank 9 of the anvil 10. The end of the other leg 11 of the clamp has a rolled knuckle or eye 12 which is of lesser length than the end of the leg 11 so as to provide forwardly of the eye a seat or ledge 19 with which the nut 13 is adapted to be detachably engaged as hereinafter described more in detail. This eye 12 has a smooth internal bore (that is, it is unthreaded), and the screw or threaded rod 14 is rotatably mounted for sliding movement in this bore. The screw 14 carries, in the usual manner, a swivel head 15 opposed to the anvil 10. It also carries a winged or other handle piece 16 by which the screw may be rotated.

The nut 13 has an internal thread 13′ to agree and co-operate with the threads on the screw 14. This nut member is also provided at its forward end with an enlarged portion of non-circular form, it preferably being externally scalloped so as to provide alternate ribs or crests 17 and depressions or grooves 18.

In the use of the device, if we assume that the screw rod 14 is in such position that the head 15 is spaced a considerable distance from the anvil 10 and that the occasion demands that the swivel head be made to approach very closely to the anvil 10 to hold some small piece of work, it would be necessary, in the case of the ordinary screw clamp, to rotate the end piece 16 through numerous turns or revolutions before the stated object could be attained. This results in a loss of time and considerable taxing of the patience of the operator. After this job, it often happens that a larger piece of work is to be clamped, and in that event, it has heretofore been necessary for the screw to be rotated back through a considerable length, and in this way much time is lost in the use of clamps of this type.

With my improved arrangement, the screw may be very quickly adjusted so as to bring its swivel head to the approximate position desired, depending upon the size of the work, by merely exerting on the outer end of the screw end thrust in an axial or longitudinal direction. The screw, having no threaded engagement with the bearing 12, will simply slide through that bearing and in so doing will carry the nut member 13 with it out of engagement with the seat 19. After the nut member is so moved out of engagement with the seat, it may be spun by the finger about the screw 14, causing it to run very rapidly along the threads of the screw to the new position desired. The nut having been roughly adjusted on the screw, the screw is moved longitudinally without rotary movement in the opposite direction so as to reengage the nut member with the saddle. In this way a rough adjustment may be obtained very quickly.

The parts are shown in operative position in Figure 1, and in which position the nut engages the end of the eye 12, and one of the depressions or grooves 18 of the scalloped portion of the nut receives the seat 19. The ribs 17 to each side of that groove straddles the seat so that the nut is held against rotation when in this position. The nut member, however, as previously stated, is free to move axially off the seat when a rough adjustment is desired. The screw having been roughly adjusted, and the nut having been reengaged with the seat 19, it is now merely necessary to turn the screw through a very few revolutions in order to bring the swivel head 15 to the final position demanded where the work is clamped between the anvil and the head.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. For example, the frame, instead of having the beads 6 disposed as shown in Fig. 2, may have one bead or corrugation pressed out in one direction and the other corrugation or bead pressed out in the other direction, and these corrugations may extend from one end of the frame to the other; also, the seams of the knuckles may be welded so as to form a strong structure.

It is also to be understood that the language used in the following claims is intended to cover all of the generic and specific features of the invention herein described and all statements of the scope of the invention which, as a matter of language, might be said to fall therebetween.

I claim as my invention:

1. An improved clamp comprising a frame having an anvil, a bearing and a seat; a screw having one end co-operating with said anvil and being freely slidable through said bearing, and a nut member threaded on said rod and adapted to be held against rotation by said seat when engaged therewith, said nut member being longitudinally slidable with respect to said seat and being disengaged from and being engaged with said seat upon longitudinal non-rotary movement of the screw.

2. An improved clamp comprising an anvil and a frame having a bearing and a ledge; a screw freely slidable through said bearing, and a nut member threaded on said screw and adapted to engage against said bearing, said nut member having an external non-circular portion adapted to overlie said ledge and to be held against rotation thereby.

3. An improved clamp comprising a body portion having an anvil, a bearing spaced from and aligned therewith, and a seat in front of said bearing; a screw having a head co-operating with said anvil, said screw being freely slidable through said bearing, operating means for said screw, and a nut member threaded on said screw for sliding movement into and out of engagement with said seat and having ribs for straddling said seat to avoid rotation of the nut.

4. An improved clamp comprising a C-shaped body portion having an anvil on the end of one of its legs, a non-threaded bearing on the end of its other leg, and a seat in front of said bearing; a screw slidably and rotatably mounted in said bearing; and an internally threaded nut on said screw adapted to engage against said bearing and having a scalloped peripheral portion receivably slidable upon said seat for avoiding rotation of the nut when in operating position.

5. An improved clamp comprising a body portion having opposed legs, an anvil carried by one of the legs, a bearing carried by the other leg, said other leg having a cut away portion forwardly of the bearing to provide a seat, a nut having internal threads and adapted to occupy said cut-away portion and to abut against said bearing, said nut having a portion formed with a scalloped periphery involving alternate ribs and depressions, said depressions adapted to selectively ride upon said seat with adjacent ribs to opposite sides thereof received against the opposite sides of the seat to avoid rotation of the nut member, said nut being freely slidable off of and on to said seat in a direction axial of the nut, a screw threaded shaft passing freely through the bearing and having threaded engagement in the nut, a swivel head on the inner end of the shaft cooperating with said anvil, and an operating piece on the outer end of said shaft.

6. An improved clamp comprising a frame having an anvil and a bearing, said frame also having means for holding a nut member against rotation, a threaded rod passing freely through said bearing and adapted to cooperate with said anvil, and a nut member threaded on said rod and adapted to be engaged with and disengaged from said means by moving the nut member in the direction of the length of said rod, said nut member being disengaged from and engaged with said means upon longitudinal movement of the rod.

7. An improved clamp comprising a frame having an anvil, a bearing and a seat; a screw passing freely through said bearing and adapted to cooperate with said anvil, and a non-expansible nut member closely encircling said screw and held against lateral movement relative thereto, said nut being adapted to slide onto and off of said seat upon longitudinal non-rotary movement of the screw.

HORACE H. RAYMOND.